No. 684,839. Patented Oct. 22, 1901.
E. W. MAULHARDT & O. L. FRAIN.
AUXILIARY SPRING FOR VEHICLES.
(Application filed Feb. 28, 1901.)
(No Model.)
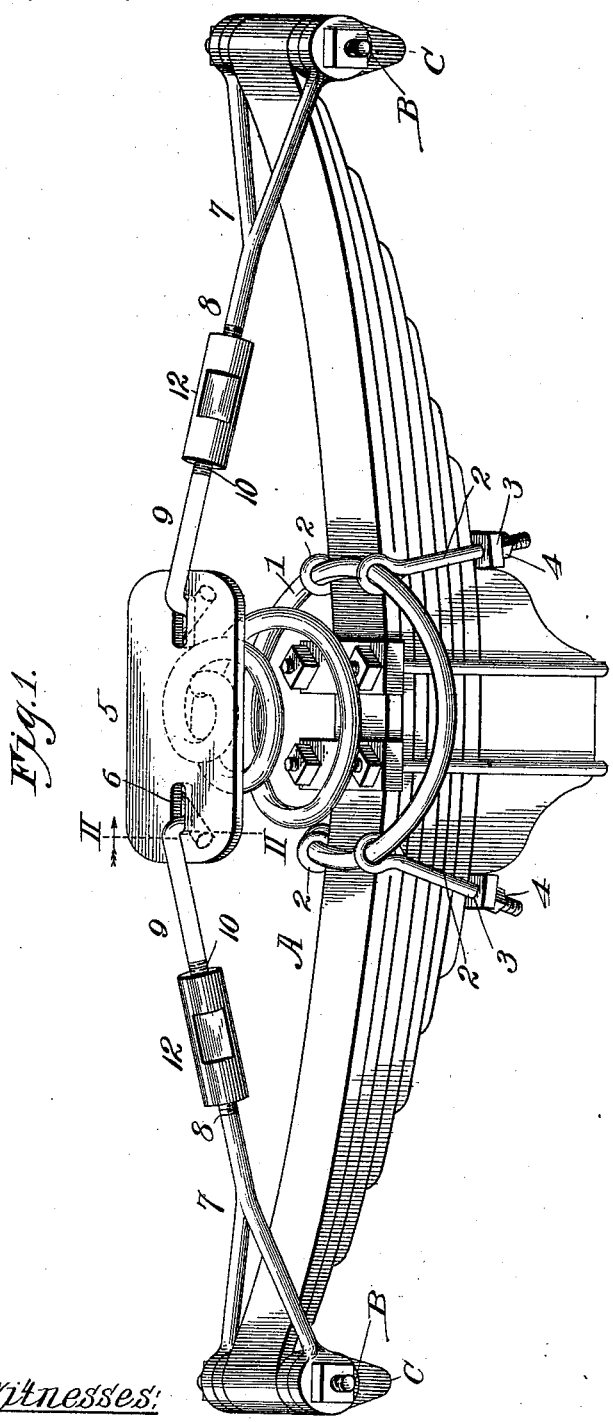
Witnesses:
H. C. Rodgers.
Arthur McArthur
Inventors:
E. W. Maulhardt
O. L. Frain
By Fischer & Thorpe
Attys.

UNITED STATES PATENT OFFICE.

EMIL W. MAULHARDT, OF ST. LOUIS, MISSOURI, AND OCTA L. FRAIN, OF OVID, MICHIGAN.

AUXILIARY SPRING FOR VEHICLES.

SPECIFICATION forming part of Letters Patent No. 684,839, dated October 22, 1901.

Application filed February 28, 1901. Serial No. 49,212. (No model.)

*To all whom it may concern:*

Be it known that we, EMIL W. MAULHARDT, residing at St. Louis, Missouri, and OCTA L. FRAIN, residing at Ovid, Clinton county, Michigan, citizens of the United States, have invented a new and useful Auxiliary Spring for Wheeled Vehicles, of which the following is a specification.

Our invention relates to auxiliary springs for wheeled vehicles, and more particularly for that class known as truck or platform wagons, which are adapted for the transportation of heavy loads; and our object is to provide an attachment for relieving the front spring or springs of the wagon of a part of the load, which can be easily and quickly applied to or removed from almost any style of wagon now on the market.

With this general object in view and others as hereinafter appear the invention consists in certain novel and peculiar features of construction and combinations of parts as hereinafter described and claimed; and in order that it may be fully understood reference is to be had to the accompanying drawings, in which—

Figure 1 is a perspective view of our auxiliary-spring mechanism as arranged to cooperate with the front spring of a wagon. Fig. 2 is a cross-section taken on the line II II of Fig. 1. Fig. 3 is a horizontal section of one of the adjustable links.

In the said drawings, 1 designates a stiff helical spring, the same being gaged to withstand pressure in proportion to the load the wagon to which it is applied is adapted to carry. This spring is arranged with its base or lower coil resting squarely upon the spring A of a wagon, being clamped rigidly thereon by means of four eyebolts 2, depending from the coil at opposite sides of the spring, the eyebolts being connected in longitudinally-alined pairs by the cross-bars 3, clamped tightly up against the spring A by clamping-nuts 4. This is our preferred method of securing the helical spring in place, though it is to be understood that any mechanical equivalent of the same may be employed for the purpose.

5 designates a plate resting upon the upper end of spring 1 and provided with alined slots 6, said slots occurring at opposite sides of the spring and extending transversely of the wagon.

A pair of links each consists of a Y portion 7, having the base of its stem threaded, as at 8, a hook portion 9, having its stem oppositely threaded, as at 10, and having the hook proper in the form of an inverted-T-shaped portion 11, depending from and extending at a suitable angle, and a turnbuckle 12, internally threaded in opposite directions at its ends and engaging the threaded portions of the Y and hook portions in order that when turned in one direction or the other said portions may be brought nearer together or moved farther apart. These links are turned at the proper angle to permit their hooks to be lowered through the slots 6 of plate 5 and are then swung, with the stem portion of the hooks proper as the pivotal point of such action, until they extend transversely of the vehicle. The forks of the links are then fitted upon bolts B, mounted in the ends of spring A, the pendent loops C upon the bolts being interposed between said forks and the spring. These loops are for the purpose of connecting the vehicle structure with the spring A, and being of the usual or any preferred type are not particularly shown or described herein.

As the vehicle-body rises and falls upon the springs the link-hooks reciprocate in slots 6 in an obvious manner, the depression of the ends of the spring under the weight suspended therefrom imposing, through the medium of said links, a downward pressure upon spring 1, whose power is thus utilized to assist the wagon-spring in sustaining the load, and by reason of such assistance it is obvious that it is unnecessary to dismantle the wagon at intervals to reset the ends of the leaves composing the wagon-spring.

In time as the springs grow weaker or in case the owner designs to load the wagon more heavily it will be found desirable to re-tension spring A by operating the turnbuckles to shorten the distance between the ends of the links, this action obviously drawing the ends of the spring A upwardly.

From the foregoing it will be apparent that the use of this coöperating spring 1 and its connection with spring A by means of links and plate 5 serves, by tying the ends of the wagon-spring together with a yielding pressure, to materially prolong its period of service. It will also be seen that it requires the services of no skilled mechanic to secure the apparatus in position and that it can be accomplished in a few minutes.

While one application of the apparatus is shown and described, it is to be understood that it is adapted for use in other connections besides those herein mentioned and that it is susceptible of various changes in the form, proportion, detail construction, and arrangement of the parts without departing from the essential spirit and scope of the invention.

Having thus described the invention, what we claim as new, and desire to secure by Letters Patent, is—

1. In an apparatus of the character described, the combination of a wagon-spring, a connection between and pivoted to the ends of said spring and consisting of a plurality of parts adjustably connected together so as to lengthen or shorten and automatically accommodate the movements of the spring, and an auxiliary spring engaging said connection and adapted to cause it to pull yieldingly upward on the ends of the first-named spring, substantially as described.

2. In an apparatus of the character described, the combination of a wagon-spring, connections between the ends of the same, comprising links and a plate having a pin-and-slot connection with said links, of an auxiliary spring engaging said plate and adapted to cause said links to pull upward upon said wagon-spring, substantially as described.

3. In an apparatus of the character described, a plate, a wagon-spring below said plate, links having a pin-and-slot connection with said plate, and pivoted to the ends of said spring, and an auxiliary spring to exert its pressure upward against said plate, substantially as described.

4. In an apparatus of the character described, the combination with a vehicle-spring, a plate above the same, and links having a pin-and-slot connection with said plate and pivoted to the ends of the spring, of an auxiliary spring interposed between the wagon-spring and said plate, eyebolts engaging auxiliary spring at opposite sides of the wagon-spring, bars connecting said eyebolts below the wagon-spring, and clamping-nuts engaging the ends of said bolts, substantially as described.

5. In an apparatus of the character described, a plate, a wagon-spring below said plate, links having a pin-and-slot connection with said plate, and pivoted to the ends of said spring, and each consisting of oppositely-threaded portions, and a turnbuckle or nut engaging the threads of said portions, and an auxiliary spring to exert its pressure upward against said plate, substantially as described.

In testimony whereof we affix our signatures in the presence of two witnesses.

EMIL W. MAULHARDT.
OCTA L. FRAIN.

Witnesses:
H. C. RODGERS,
G. Y. THORPE.